United States Patent

Zachow et al.

(10) Patent No.: US 8,346,504 B2
(45) Date of Patent: Jan. 1, 2013

(54) SENSOR AND METHOD FOR THE DETECTION OF LOCAL DISPLACEMENTS AND ROTATIONS

(75) Inventors: Jochen Zachow, Schefflenz (DE); Jörg Eckrich, Wiesbaden (DE); Sven Böhm, Oberhausen (DE)

(73) Assignee: Continental Teves AG & Co.OHG, Frankfurt (DE)

( * ) Notice: Subject to any disclaimer, the term of this patent is extended or adjusted under 35 U.S.C. 154(b) by 1253 days.

(21) Appl. No.: 11/885,099

(22) PCT Filed: Feb. 20, 2006

(86) PCT No.: PCT/EP2006/060097
§ 371 (c)(1),
(2), (4) Date: Apr. 16, 2008

(87) PCT Pub. No.: WO2006/092365
PCT Pub. Date: Sep. 8, 2006

(65) Prior Publication Data
US 2011/0144940 A1   Jun. 16, 2011

(30) Foreign Application Priority Data

Mar. 3, 2005  (DE) .................. 10 2005 010 275
Feb. 17, 2006  (DE) .................. 10 2006 007 871

(51) Int. Cl.
*G01C 9/00* (2006.01)
(52) U.S. Cl. ..................................... 702/150
(58) Field of Classification Search ............ 702/150; 341/116
See application file for complete search history.

(56) References Cited

U.S. PATENT DOCUMENTS

| 4,369,408 | A | | 1/1983 | Plohn et al. |
| 5,774,074 | A | * | 6/1998 | Cooper et al. .................. 341/11 |
| 6,188,341 | B1 | * | 2/2001 | Taniguchi et al. ............ 341/116 |
| 6,700,367 | B1 | * | 3/2004 | Santos et al. .................. 324/165 |
| 2005/0179429 | A1 | * | 8/2005 | Lohberg ................... 324/207.13 |

FOREIGN PATENT DOCUMENTS

| EP | 0034839 | 9/1981 |
| EP | 1475292 | 11/2004 |
| WO | 9854483 | 12/1998 |

OTHER PUBLICATIONS

Patent Abstracts of Japan, publication No. 11174074 A, date of publication: Jul. 2, 1999, Applicant: Hitachi Ltd.

* cited by examiner

*Primary Examiner* — Mohamed Charioui
*Assistant Examiner* — Manuel Rivera Vargas

(57) ABSTRACT

Sensor (3) and method for the detection of the movement of an encoder to be monitored with at least two sensor elements (6, 7), which are arranged in a way offset relative to each other in the direction of movement of the encoder, and with a processing circuit (10, 14, 15), which converts the element output signals (S1, S2) at the outlets of the sensor element (6, 7) to a sensor output signal (S5) that describes the movement of the encoder, with the processing circuit (10, 14, 15) including a test circuit (14), which monitors the element output signals (S1, S2) at least indirectly and disables or corrects the sensor output signal (S5) when errors of the element output signals (6, 7) are detected.

12 Claims, 2 Drawing Sheets

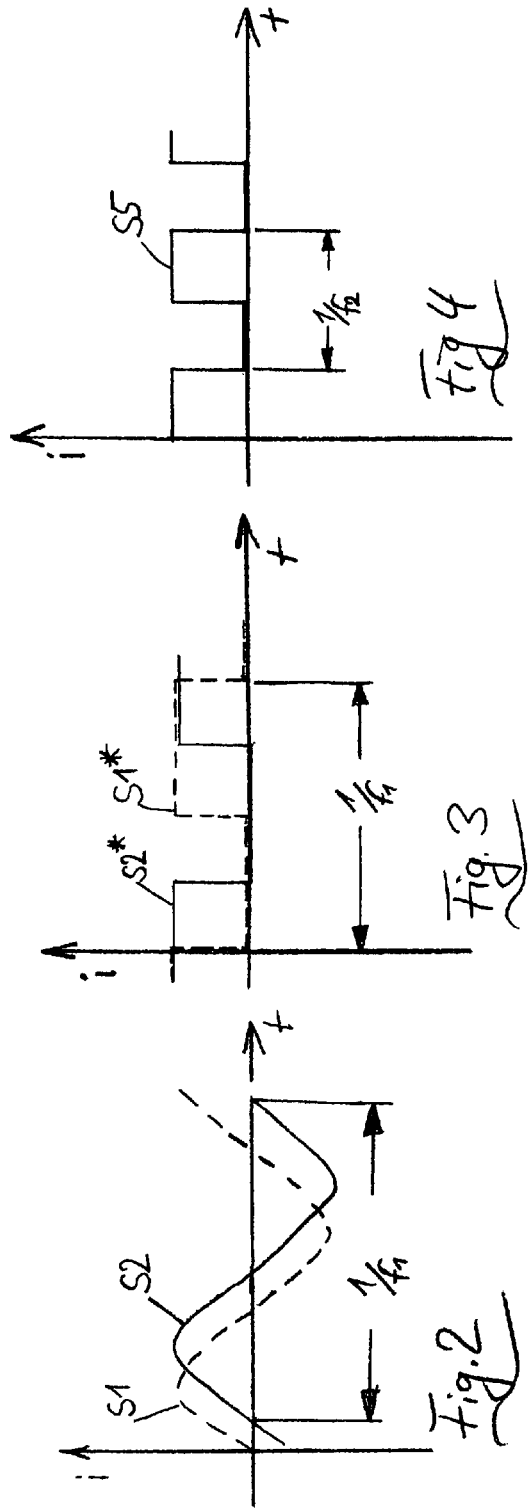
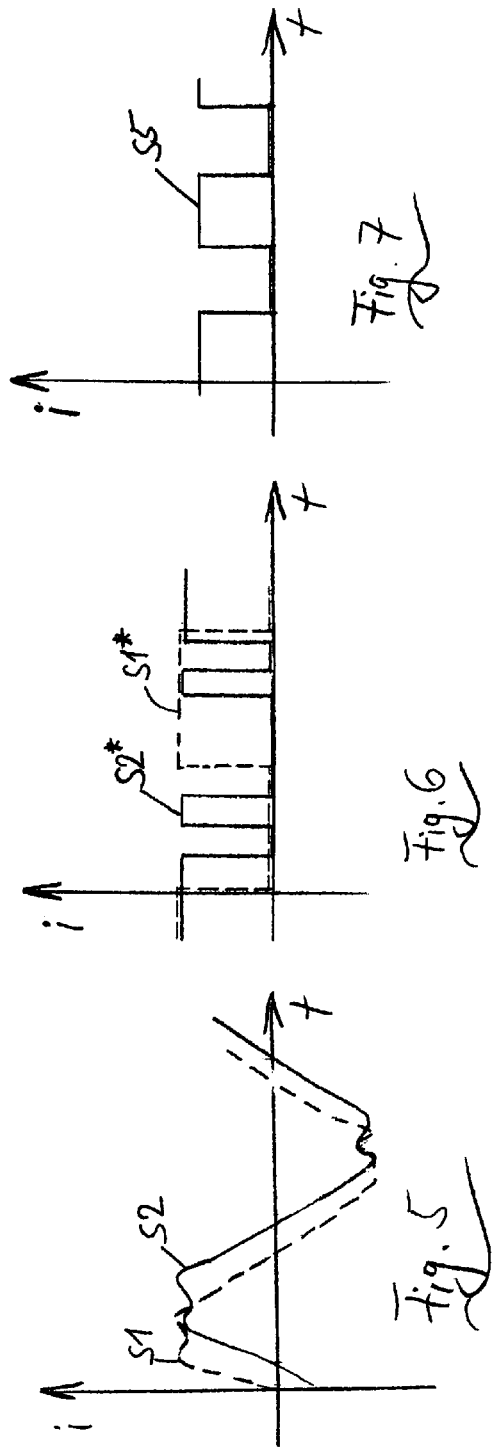

SENSOR AND METHOD FOR THE DETECTION OF LOCAL DISPLACEMENTS AND ROTATIONS

This application is the U.S. national phase of international application PCT/EP2006/060097 filed Feb. 20, 2006, which designated the U.S. and which claims the benefit of priority of German Patent Application Number 10 2006 007 787.3 filed Feb. 17, 2006 and German Patent Application Number 10 2005 010 275.1 filed Mar. 3, 2005. The contents of each of the aforementioned documents are incorporated herein in their entirety.

BACKGROUND OF THE INVENTION

The present invention relates to a sensor for the detection of the movement of an encoder to be monitored with at least two sensor elements (6, 7), which are arranged in a way offset relative to each other in the direction of movement of the encoder, and with a processing circuit (10, 14, 15), which converts the element output signals (S1, S2) at the outlets of the sensor element (6, 7) to a sensor output signal (S5) that describes the movement of the encoder. the processing circuit (10, 14, 15) includes a test circuit (14), which monitors the element output signals (S1, S2) at least indirectly and disables or corrects the sensor output signal (S5) when errors of the element output signals (6, 7) are detected. The invention also relates to a method for monitoring and eliminating sensor faults in a sensor (3) for the detection of the movement of an encoder with at least two sensor elements (6, 7), which are arranged in a way offset relative to each other in the direction of movement of the encoder, and with a processing circuit (10, 14, 15), which converts the element output signals (S1, S2) at the outlets of the sensor elements (6, 7) to a sensor output signal (S5) that describes the movement of the encoder. A test circuit (14) in a processing circuit (10, 14, 15) monitors the element output signals (S1, S2) at least indirectly and disables or corrects the sensor output signal (S5) when errors of the element output signals (6, 7) are detected.

Devices for the detection of rotational speeds in motor vehicles are principally known in the art. Basically, they comprise an encoder and a sensor magnetically coupled to the encoder via an air slot. The encoder is a machine element, which is mechanically connected to the rotating ring of a wheel bearing and carries an incremental angular scale. Said angular scale is designed as an integral sequence of magnetically alternating, differently effective areas forming a circular encoder track. It is conventional practice to use toothed wheels, ferromagnetic perforated discs or permanent-magnetized structures, e.g. magnetized wheel bearing seals as encoders. The sensor reacts to the periodic changes between tooth/gap or hole/web or north/south pole with a periodic electric signal reproducing the incremental angular spacing as a temporal voltage or current variation. Induction coils, magneto-resistive bridges and Hall elements are used as sensorially active components, being partly operated in combination with additional electronic circuits. It is usual to designate sensors as 'active sensors' when they require a current supply for operation and as 'passive' sensors when they do not need an additional current supply for operation, exactly as induction coils.

To be able to realize larger air gap lengths in sensor assemblies of this type, proposals have already been made to bisect the incremental bearing discrimination of the encoder and to compensate it again thereafter by doubling mechanisms with the use of sensors being locally shifted in relation to each other. Thus, DE 199 06 937 recommends using two Giant Magnetoresistive Effect sensors whose local positioning in relation to each other brings about a phase shift of roughly 90°. The signals (S1, S2) of the two sensors are amplified, led through threshold value switches and exclusively OR-operated. Another objective is to determine the direction of rotation by means of flip-flop circuits. Further proposals are directed to arranging the sensors jointly on one chip in order to be able to maintain the distance between both sensors as precisely as possible.

The application of this prior art is obstructed in several ways in practical operations. Thus, it is necessary to combine identical sensors with encoders of different modules (module=reading diameter/encoder number of cycles) for the case of application of the detection of the rotational speed in an automobile. According to experience, the module range is between 1.2 mm and 2.5 mm, that means, a ratio of the possible modules of 2.5/1.2=roughly 2 must be covered. In order to preserve always a phase shift of roughly 90°, it would be necessary according to this provision to keep on stock a large number of different sensors adapted to different modules. This necessity counteracts the goal of an economical manufacture and high quality of large piece numbers of an equal product. When module adaptation is omitted, another shortcoming that occurs involves that, with increasing phase deviations from the nominal value of 90°, each of the exclusively OR-operated sensorial channels contributes an individually fluctuating pulse-duty factor to the total signal, with the result of inadmissibly increasing the jitter for the operation of modern brake controllers.

When the two phase-shifted signals S1 and S2 of the sensor elements are processed appropriately and are then united for doubling the output signal, as has been described hereinabove, the nominal frequency $f_2$ is achieved.

The sensors known from prior art inhere the problem that errors occur in the output signals of the sensor elements. These errors change the output signal of a sensor element in such a fashion that it deviates from its typical course, which corresponds to the application, or that the signal variation suffers from disturbances. These errors, which must be eliminated, can be due to a variety of different effects. In this connection, the effect is referred to as an example that the sensor signal is disturbed or corrupted due to an inexact distance or an inexact positioning between encoder and sensor or due to variations in distance. Among others, these disturbances frequently represent harmonic wave components in the sensor signal or different frequency fluctuations of the signal. These errors can become conspicuous in the course of further signal processing. In some cases, the result is even that the errors are amplified, in particular when the respective signal amplitude is evaluated by way of defined threshold values, or, respectively, the further signal variation orients itself by threshold values of this type. In this regard, particularly amplified frequency instabilities can occur in addition to intensified amplitude errors, because disturbances, which are revealed in spurious harmonic wave components and whose amplitude value is in the range of a threshold value imply quick abrupt changes in amplitude.

Thus, the invention is based on a sensor for the detection of the movement of an encoder to be monitored with at least two sensor elements (6, 7), which are arranged in a way offset relative to each other in the direction of movement of the encoder, and with a processing circuit (10, 14, 15), which converts the element output signals (S1, S2) at the outlets of the sensor element (6, 7) to a sensor output signal (S5) that describes the movement of the encoder. the processing circuit (10, 14, 15) includes a test circuit (14), which monitors the element output signals (S1, S2) at least indirectly and disables or corrects the sensor output signal (S5) when errors of the element output signals (6, 7) are detected. Additionally, the invention is based on a method for monitoring and eliminating sensor faults in a sensor (3) for the detection of the movement of an encoder with at least two sensor elements (6, 7), which are arranged in a way offset relative to each other in the direction of movement of the encoder, and with a processing circuit (10, 14, 15), which converts the element output signals (S1, S2) at the outlets of the sensor elements (6, 7) to a sensor output signal (S5) that describes the movement of the encoder. A test circuit (14) in a processing circuit (10, 14, 15) monitors the element output signals (S1, S2) at least indirectly and disables or corrects the sensor output signal (S5) when errors of the element output signals (6, 7) are detected.

SUMMARY OF THE INVENTION

An objective of the invention at topic can be seen in correcting or suppressing the errors mentioned hereinabove, or to eliminate them.

This object is achieved according to the invention by a sensor for the detection of the movement of an encoder to be monitored with at least two sensor elements (6, 7), which are arranged in a way offset relative to each other in the direction of movement of the encoder, and with a processing circuit (10, 14, 15), which converts the element output signals (S1, S2) at the outlets of the sensor element (6, 7) to a sensor output signal (S5) that describes the movement of the encoder. the processing circuit (10, 14, 15) includes a test circuit (14), which monitors the element output signals (S1, S2) at least indirectly and disables or corrects the sensor output signal (S5) when errors of the element output signals (6, 7) are detected. The object is also achieved by a method for monitoring and eliminating sensor faults in a sensor (3) for the detection of the movement of an encoder with at least two sensor elements (6, 7), which are arranged in a way offset relative to each other in the direction of movement of the encoder, and with a processing circuit (10, 14, 15), which converts the element output signals (S1, S2) at the outlets of the sensor elements (6, 7) to a sensor output signal (S5) that describes the movement of the encoder. A test circuit (14) in a processing circuit (10, 14, 15) monitors the element output signals (S1, S2) at least indirectly and disables or corrects the sensor output signal (S5) when errors of the element output signals (6, 7) are detected.

Thus, with respect to the sensor of the invention, the core of the invention is to check the output signals of the sensor elements or the signals derived therefrom with respect to errors and to disable or correct the sensor output signal depending on detected errors.

In the simplest case, the correction or disablement of the sensor output signal is made directly dependent on the identification of an error of the element output signals. In many cases, however, the sensor output signal is produced by way of the production of intermediate signals as is explained in the following e.g. in DE 199 06 937 A1 or in DE 102 17 435 A1, which has not yet been published.

A magnetized encoder track passes by below a magnetoresistive bridge. Except for their direction of effect relative to the magnet vector of the encoder, the four bridge resistors are largely identical. The respectively existing direction of effect is characterized by the symbols (+) and (−), implying increase or decrease of the bridge resistance with the same direction of field, so that two partial voltages are produced. There is a distance in position φ between the bridge branches. With a positive local phase at zero passage of the signal function DIF, an extreme value of the signal function SUM is corresponding, so that the signal courses remain orthogonal relative to each other, consequently they always have a 90° phase shift relative to each other. The same applies to a negative local phase. The correlation is independent of the size of the local phase in the module ratio 2:1 aimed at and, thus, achieves the desired goal. It is preferably suggested realizing roughly 40° local phase in the sensor with the smallest module desired.

In an improvement of the invention, at least one intermediate signal (S1*, S2*) is produced in the computing stage (15), whose frequency depends on the frequencies of the two separate element output signals (6, 7), and that the test circuit (14) tests the intermediate signal (S1* or S2*) with regard to deviations, which are due to errors of the element output signals (6, 7). Two intermediate signals (S1*, S2*) may be produced in the test circuit (14), that the development of the edges of the intermediate signals by the test circuit depends on the edges of the phase-shifted element output signals (6, 7) being regularly of equal frequency, and that the test circuit (14) checks the intermediate signals with respect to whether the appearing edges of the intermediate signals in succession alternatingly originate from different intermediate signals. Intermediate signals of this type can be produced e.g. by means of a threshold value circuit, which is respectively allocated to the outlet of a sensor element, or by means of a sum circuit and a differentiating circuit (summation device or difference producing device, respectively), to which both outputs of the sensor elements are sent in each case.

It is preferred with the above-mentioned sensor elements, which particularly output a doubling signal frequency relative to a moving encoder and, to this end, use the evaluation of two signal paths, that the errors in the output signal that must be eliminated are corrected or suppressed by correcting or suppressing a wrong frequency output.

It is expedient that at least one intermediate signal is produced in the computing stage, whose frequency depends in each case on the frequencies of the two element output signals, and that the test circuit tests the intermediate signal with regard to deviations, which result from errors of the element output signals. The deviation test permits detecting errors or disturbances.

A particularly simple embodiment of the test circuit can be implanted by a test circuit (14) disables the sensor output signal (S5) when two or more successive edges of the intermediate signals (S1*, S2*) belong to the same intermediate signal. Also, upon failure of an edge of the one intermediate signal (S1*, S2*), the edges of the other intermediate signal (S1*, S2*) are disabled until an edge of the one intermediate signal (S1*, S2*) appears again so that no edge is active in this period for producing the sensor output signal (S5). If several edges of a defined intermediate signal (S1*, S2*) appear in direct succession, only the first edge is effective in the sense of producing an edge of the sensor output signal (S5), depending on the detected error.

Preferably, the test circuit disables the sensor output signal when two or more successive edges of the intermediate signals belong to the same intermediate signal. This avoids incorrect actuation of a motor vehicle control system in the case of a malfunction.

It is preferred that upon failure of an edge of the one intermediate signal, the edges of the other intermediate signal are in their disabled state until an edge of the one intermediate signal appears again so that no edge is active in this period for producing the sensor output signal. After an error has occurred and after the resulting disablement of the output signal, the processing circuit stays active and records when correct signals appear again in order that the output signal can be emitted again.

It is suitable that the test circuit is provided with a frequency detection device, which checks the frequencies of the intermediate signals and/or the element output signals and, in the event of irregularities of the respective frequencies, disables the sensor output signal and/or at least one intermediate signal. This allows reliably detecting errors or disturbances, and the erroneous signal path can be suppressed directly.

Further favorable embodiments of the invention can be taken from the following description of an embodiment by way of Figures.

BRIEF DESCRIPTION OF THE DRAWINGS

In schematic views in the drawings:

FIG. 2 shows the course of undisturbed output signals of the sensor elements;

FIG. 3 shows the course of intermediate signals depending on element output signals according to FIG. 2;

FIG. 4 shows the course of the sensor output signal depending on the intermediate signals according to FIG. 3;

FIG. 5 shows the course of disturbed element output signals of the sensor elements;

FIG. 6 shows the course of intermediate signals depending on element output signals according to FIG. 5, and FIG. 7 shows the course of the corrected sensor output signal depending on the intermediate signals according to FIG. 5.

DETAILED DESCRIPTION OF THE DRAWINGS

Figure 1:
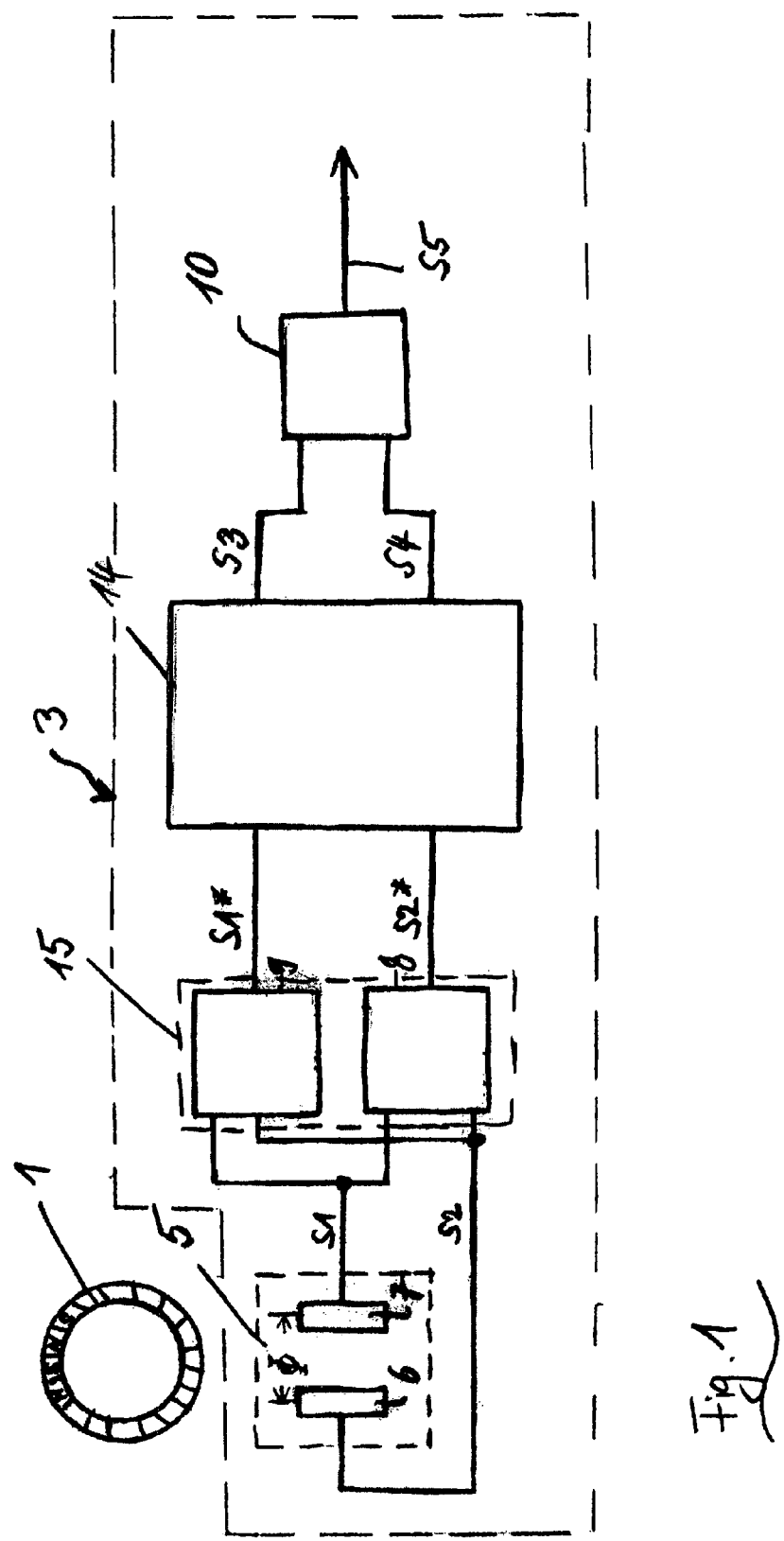
FIG. 1 shows the structure of a sensor of the invention.

As shown in FIG. 1, the arrangement of the invention provides for an encoder 1 cooperating by way of magnetic coupling with an active sensor 3 that transmits, in turn, wheel speed signals to an electronic checking device (not shown) by way of the sensor output signal 5. Machine elements are generally referred to as encoders herein, which are designed as incremental scale embodiment. To explain the invention, angular scales are primarily used, however, all designs equally apply to linear travel scales. The angular scale is composed of an integral sequence of equal areas of alternating magnetic north and south poles forming an encoder track closed to form a circle.

For the wheel rotational speed detection, the encoder 1 is mechanically connected to the rotating ring of the wheel bearing, and the stationary active sensor scans the magnetic field strength variation of the encoder track in a magnetically non-contact manner across an air slot. The encoder rotates at an angular velocity ω.

Sensor 3 houses a magneto-electric transducer 5 including two sensor elements 6, 7, which are offset by the distance Φ in relation to each other and act in such a manner that two signals $S_1=A*\sin(\omega t)$ and $S_2=-A*\sin(\omega t)+\phi)$ are produced in a rotating encoder. The element output signals $S_1$ and $S_2$ are sent to a computing stage 15. Computing stage 15 contains two channels. The partial signal sum $SUM=S_1+S_2$ is produced in the first channel, and the partial signal difference $DIF=S_1-S_2$ is produced in the second channel. The intermediate signals S1* and S2* at the outputs of the channels 8, 9 are sent directly to a uniting circuit 10 that is configured as an exclusively OR-operated circuit. The sensor output signal S5, which indirectly results from SUM and DIF, has the favorable characteristic that a total signal with a symmetric pulse-duty factor is produced always in a largely module-independent way, with the result that the desired frequency doubling is achieved with this signal in addition.

Between the uniting circuit 10 that is configured as an exclusively OR-operated circuit and the outputs of the computing stage 15, according to the invention, a test circuit 14 is arranged, which controls the output of its test output signals S3, S4 depending on S1 and S2 or depending on S1* and S2*. For example, the test circuit 14 can compare the frequencies of the two signals S1* and S2*, and this is preferably carried out by an evaluation of the sequence of edges, and can decide on the basis of this frequency comparison, whether an error or a malfunction prevails.

When the signals S1* and S2* or the signals S1 and S2 are correct, they can pass the test circuit 14 in the form of S3, S4, and they are put together to achieve the sensor output signal S5 by the uniting circuit 10. As this occurs, the sensor output signal S5 jumps up and down between two potentials with each newly arriving edge of S3 and S4. The result is that, in consequence of the exclusively OR-operation of the two signals S3 and S4, the sensor output signal S5 has a positive potential only when either only S3 or only S4 has a positive potential.

These correlations are illustrated in FIGS. 2, 3 and 4. The sinusoidal element output signals S1 and S2, which are offset by an angle that can amount to 90°, are transformed in the computing stage 15 into signals S1* and S2*, which are offset by 90°, as has been explained in the above-mentioned passages of literature. Consequently, the sensor output signal S5 of the uniting circuit 10 assumes the shape illustrated in FIG. 4.

It shall be assumed with regard to FIG. 5 that S1 and S2 inhere faults in the type of harmonic waves, which e.g. cause a temporary frequency variation of the signals S2* in FIG. 6, which was produced by the summation device. The occurrence of frequency variations, harmonic waves or other signal errors on at least one of the two signals S1 and S2 can also cause disturbance of both S1* and S2*. For example, the harmonic waves can develop because the sensor elements of the transducer 5 have a too short distance from the encoder 1 or distance variations.

The test circuit 14 operates in such a manner that it evaluates whether the edges of S1* and S2* with respect to their time history occur alternatingly in a correct fashion. In this case, the signal variations of S3 and S4 correspond to the signal variations of S1* and S2*.

If, however, e.g. the edge of S2* due to a malfunction occurs erroneously several times in direct succession, as is shown in FIG. 6, only the first edge becomes operative, the other edges of S2* are suppressed or filtered until an edge of S1 appears. Thus, the corrected sensor output signal S5 according to FIG. 7 is achieved.

If one of the intermediate signals S1* or S2*(e.g. S2*) is missing and if its edge is not identified by the test circuit 14, the output signal (e.g. S3) associated with the other intermediate signal (e.g. S1*) is not output by the test circuit 14 until the edge of the respective intermediate signal is no more missing. Since neither S4 (due to the lacking S2*) nor S3 are output, the uniting circuit is unable to produce a signal S5 so that the subsequent control is disabled during this case of fault on account of a missing sensor output signal S5.

The invention claimed is:

1. A method for monitoring and eliminating sensor faults in a sensor (3) for detecting movement of an encoder with at least two sensor elements (6, 7), wherein the sensor elements are arranged in a way offset relative to each other in a direction of movement of the encoder, the method comprising:

converting output signals (S1, S2) at outlets of the sensor elements (6, 7) to a sensor output signal (S5) that describes movement of the encoder;

monitoring the output signals (S1, S2) at least indirectly including producing at least two intermediate signals (S1*, S2*) in a computing stage (15) such that a frequency of the two intermediate signal depends on frequencies of the output signals (S1, S2) produced by the at least two separate sensor elements (6, 7), and the test circuit (14) tests the two intermediate signals (S1*, S2*) with regard to deviations, which are due to errors of the element output signals (S1,S2) and; and disabling or correcting the sensor output signal (S5) when errors of the output signals (6, 7) are detected wherein upon failure of the test circuit (14) to detect an edge of one of the two intermediate signals (S1*, S2*), the edges of the other of the two intermediate signals (S1*, S2*) are disabled until an edge of the one the two intermediate signals (S1*, S2*) appears again so that no edge is active in this period for producing the sensor output signal (S5).

2. The method of claim 1, wherein two intermediate signals (S1*, S2*) are produced and development of edges of the intermediate signals depends on edges of the phase-shifted output signals (6, 7) being regularly of equal frequency, and the intermediate signals are checked with respect to whether the edges of the intermediate signals in succession alternatingly originate from different intermediate signals.

3. The method of claim 2, further comprising disabling the sensor output signal (S5) when two or more successive edges of the intermediate signals (S1*, S2*) belong to the same intermediate signal.

4. The method of claim 2, wherein the edges of the sensor output signal (S5) upon the alternating regular occurrence of the edges of the two intermediate signals (S1*, S2*) are produced in such a fashion that the sensor output signal has double the frequency of the intermediate signals, with the edges of the sensor output signal being associated alternatingly with the edges of the intermediate signals.

5. The method of claim 2, wherein if several edges of a defined intermediate signal (S1*, S2*) appear in direct succession, only the first edge is effective in producing an edge of the sensor output signal (S5).

6. The method of claim 2, further comprising checking the frequency of at least one of the intermediate signals (S1*, S2*) and the output signals (S1,S2) and, in the event of irregularities of individual frequencies, disabling at least one of the sensor output signal (S5) and at least one intermediate signal (S1*, S2*).

7. A sensor (3) for detecting movement of an encoder to be monitored, the sensor comprising:
two or more sensor elements (6, 7), which are arranged offset relative to each other in a direction of movement of an encoder; and
a processing circuit (10, 14, 15), which converts sensor element output signals (S1, S2) of the sensor element (6, 7) to a sensor output signal (S5) that describes the movement of the encoder, wherein the processing circuit (10, 14, 15) includes a computing stage (15) and a test circuit (14), which monitors the sensor element output signals (S1, S2) at least indirectly and disables or corrects the sensor output signal (S5) when errors of the sensor element output signals (S1, S2) are detected, wherein at least two intermediate signals (S1*, S2*) are produced in the computing stage (15), a frequency of the two intermediate signals (S1*, S2*) depend on frequencies of the two separate sensor element output signals (S1, S2), and the test circuit (14) tests the two intermediate signals (S1*, S2*) with regard to deviations which are due to errors of the element output signals (S1,S2) and wherein upon failure of an edge of one the two intermediate signals (S1*, S2*), the edges of the other of the two intermediate signals (S1*, S2*) are disabled until an edge of the one the two intermediate signals (S1*, S2*) appears again so that no edge is active in this period for producing the sensor output signal (S5).

8. The sensor of claim 7, wherein the two intermediate signals (S1*, S2*) are produced in the test circuit (14), that the development of the edges of the intermediate signals by the test circuit depends on the edges of the phase-shifted element output signals (6, 7) being regularly of equal frequency, and that the test circuit (14) checks the intermediate signals with respect to whether the appearing edges of the intermediate signals in succession alternatingly originate from different intermediate signals.

9. The sensor of claim 7, wherein the test circuit (14) disables the sensor output signal (S5) when two or more successive edges of the intermediate signals (S1*, S2*) belong to the same intermediate signal.

10. The sensor of claim 7, wherein edges of the sensor output signal (S5) in the processing circuit (10, 14, 15) upon alternating regular occurrence of the edges of the two intermediate signals (S1*, S2*) are produced so that the sensor output signal has double the frequency of the intermediate signals, with edges of the sensor output signal being associated alternatingly with edges of the intermediate signals.

11. The sensor of claim 7, wherein if several edges of a defined intermediate signal (S1*, S2*) appear in direct succession, only the first edge is effective in the sense of producing an edge of the sensor output signal (S5).

12. The sensor of claim 7, wherein the test circuit (14) is provided with a frequency detection device, which checks the frequencies of at least one of the intermediate signals (S1*, S2*) and the element output signals (S1,S2) and, in the event of irregularities of the respective frequencies, disables the respective sensor output signal (S5) or at least one intermediate signal (S1*, S2*).

* * * * *